W. L. C. KOCH.
FISH HOOK.
APPLICATION FILED FEB. 17, 1914.
1,134,622.
Patented Apr. 6, 1915.
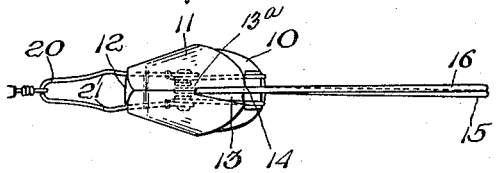
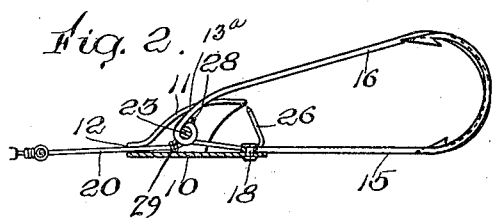
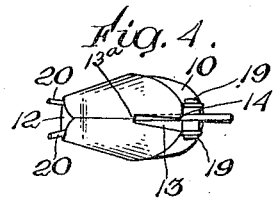
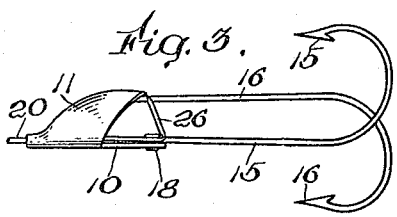
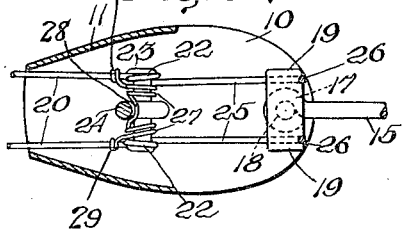
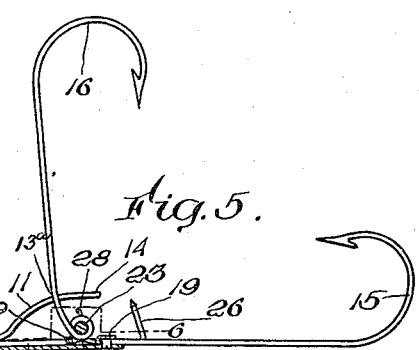
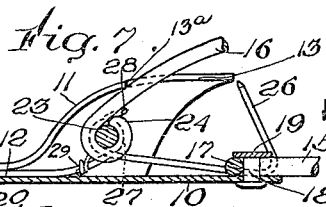
Witnesses:
H. A. Rahn
P. W. Pezzetti
Inventor:
William L. C. Koch,
by Wright Brown Quinby & May
Attys.

UNITED STATES PATENT OFFICE.

WILLIAM L. C. KOCH, OF DEDHAM, MASSACHUSETTS.

FISH-HOOK.

1,134,622.  Specification of Letters Patent.  Patented Apr. 6, 1915.

Application filed February 17, 1914. Serial No. 819,195.

*To all whom it may concern:*

Be it known that I, WILLIAM L. C. KOCH, a citizen of the United States, and resident of Dedham, in the county of Norfolk and State of Massachusetts, have invented certain new and useful Improvements in Fish-Hooks, of which the following is a specification.

This invention relates to improvements in fish hooks, and has particular reference to devices of this character that are used especially for trolling.

One of the objects of the invention is to provide a fish hook which is weedless in that means are provided for practically preventing the catching and dragging of weeds.

Another object is to provide a device of this character which enables the bait to be conveniently applied, and will so hold or carry the bait that it cannot be taken from the hook by the fish. In this connection a subordinate object is to provide a device which will prevent bait from being put on alive, the device being therefore humane.

Another object is to provide a device of this character which, when drawn through the water as when trolling, will always have a predetermined portion uppermost.

Another object is to provide improved means which, when a fish bites, will be certain to assume position to catch the fish.

With the above and further objects in view, my improvements consist in the construction and combination of parts substantially as hereinafter described and claimed.

Of the accompanying drawings: Figure 1 is a plan view of a fish hook embodying my invention; Fig. 2 is a side elevation of the same, partly in section, with the hooks occupying their relative positions when fishing; Fig. 3 is a side elevation, but showing the two hooks in the relative positions which they occupy after they have been taken by the mouth of a fish; Fig. 4 is a plan view similar to a portion of Fig. 1, but showing the upper hook as caught by the shoulder of the carrier when said upper hook has been shifted to the position shown in Fig. 3; Fig. 5 is a view similar to Fig. 2, showing the relative positions of the parts when bait is to be introduced or removed; Fig. 6 represents an enlarged section on line 6—6 of Fig. 5; Fig. 7 is an enlarged sectional view similar to a portion of Fig. 2.

Similar reference characters indicate similar parts in all of the views.

The carrier for the two hooks, shown as having a somewhat cone-shaped formation, has a flat base 10 and a top 11. In practice the flat base 10, with the parts supported thereby, is heavier than the top 11 so as to aid in insuring the travel of the hook through the water with the hook 16 hereinafter described uppermost, in the position shown in Fig. 2. While the entire housing or carrier 10, 11, is preferably of aluminum, I do not limit myself to the use of that metal.

The smaller end of the carrier is formed with a flattened aperture 12, and the top of the carrier is provided with a slot 13 which opens rearwardly, the metal at one side of said slot so projecting as to extend across the path of movement of the hook 16 as hereinafter described, the overlapping portion constituting a catch shoulder or detent 14.

The hooks 15, 16, are employed, said hooks being relatively movable as hereinafter described. Each hook has a shank portion and a bent and pointed end portion. For convenience of description the hook 15 may be referred to as the stationary hook in that it is fixed relatively to the carrier, while the hook 16 is movable since it is pivoted as hereinafter explained. The hook 15 is secured to the carrier as by means of a rivet 18 passing through the eye 17 of the hook 15 and through the base 10 of the carrier. Two guide wings 19 are formed for the bait hooks presently described, said guide wings, in the embodiment of the invention illustrated, being formed by lugs projecting from the top of the rivet 18. A sliding loop 20, preferably of spring wire, passes through the aperture 12, said loop having diverging portions 21 which must be compressed toward each other when the loop 20 is shifted from the position shown in Fig. 1 to the position shown in Fig. 5. In other words, the diverging portions 21, owing to the fact that the loop 20 is of spring wire, tend to hold the parts in the relative positions shown in Figs. 1 and 2, while still permitting the loop 20 to be slid far enough into the carrier or housing to enable the parts to assume other positions hereinafter described.

Coils 22 formed in the wire composing the slide loop 20 (see Fig. 6) carry a transverse stud 23 which provides a pivotal support for the eye 24 of the upper movable hook 16. From these coils the wire extends forwardly as at 25, under the guide wings 19, and then upwardly as at 26, the portions 26 being sharpened and forming bait hooks upon which a frog or a minnow or other suitable bait may be impaled when the parts are in the position shown in Fig. 5. The shank portions 25 of the bait hooks 26 extend under the guide wings 19 as mentioned, and the bait hooks 26 are bent upwardly so that the angles between the portions 25, 26, co-act with the outer edges of the guide wings 19 to serve as stops for limiting the inward positions of the bait hooks 26. When the bait hooks are in this position their points are guarded by the rear edge of the top 11 of the carrier.

Coiled at 27 upon the stud 23 is a spring having a central looped portion 28 which bears against the under side of the shank of hook 16 under its pivot, the other ends of the spring being suitably secured as by wrapping their ends 29 around portions of the loop 20 as shown by Figs. 6 and 7. This spring serves to hold the hook 16 with its shank bearing against the inner end of the slot 13 when the hook is in position for use as shown in Figs. 1 and 2. Said spring also yieldingly opposes movement of the hook 16 to the position shown in Fig. 3.

When the hook is to be baited, the carrier is grasped in one hand and the loop 20 in the other hand (the latter having any suitable means such as a swivel for connecting it with a fish-line) and the loop 20 is then slid or pushed into the carrier, thereby shifting the pivot stud 23 toward the open end of the carrier and shifting the bait hooks to substantially the position shown in Fig. 5. If the spring does not raise the hook 16 high enough for the introduction of bait, said hook can be easily raised higher because of the shifted position of the stud 23. Any suitable bait such as a frog or a minnow is then impaled upon one or both of the hooks 26. The hook 16 is then turned down and the loop slide 20 pushed back to the position shown in Figs. 2 and 7, the contact of the shank of the hook 16 with the inner end 13ª of the slot 13 causing the two hooks 15, 16 to assume the relative positions shown in Fig. 2, the bait being then held within the space between the two hooks. The parts are so proportioned that when in the position just described, the point of each of the two hooks is close beside a portion of the other hook so as to be guarded thereby, thus avoiding liability of the catching of weeds upon the hooks when the hook is moving. When the hook is being drawn through the water in trolling it naturally moves along with the hook 16 uppermost. If now a fish seeks to get the bait the closing of the jaws of the fish upon the two hooks 15, 16, causes the hooks to move to the relative positions shown in Figs. 3 and 4, the shank of the hook 16 riding along the inclined side of the slot 13 and then snapping under catch shoulder 14. This results in the hooks crossing each other with the points and barbs of both hooks exposed as shown in Fig. 3, thereby rendering it practically impossible for the fish to get free. At the same time it is impossible for him to dislodge the bait and consequently, when the fish has been drawn from the water and released from the hooks 15, 16, the bait remains attached to the bait hooks 26. The user then pushes the hook 16 aside to release it from the catch shoulder 14, and then the spring 28 shifts the hook 16 back to the position shown in Figs. 2 and 7, the points and shanks of the hooks then overlapping side by side so as to guard the points, the hook being then in condition baited for further use.

It will be seen that when the device is set as shown by Fig. 2, the hooks 15 and 16 form a loop which guards the points of the hooks and projects from the carrier and is adapted to enter the mouth of a fish, the shank portions of the hooks being movable toward each other by the natural pressure of the jaws of the fish thereon, to spring the hook, or, in other words, to cause the bent portions of the hooks to cross each other and expose the points as shown by Fig. 3.

It will also be seen that the spring 28, the slot end 13ª, and the inclined side of the slot 13 are adapted to confine the pivoted hook successively in the positions shown by Figs. 2 and 3, and that the slot end 13ª moves the pivoted hook to the position shown by Fig. 2 when the bait holder is drawn inwardly from the position shown by Fig. 5.

Having described my invention, I claim:

1. A device of the character described, comprising a carrier having a laterally inclined slot, a hook having a fixed connection with the carrier, a second hook having a pivoted and sliding connection with the carrier, and a spring for normally holding the second hook with its shank extending through said slot.

2. A device of the character described, comprising a carrier, a hook having a fixed connection therewith, a second hook pivoted to the carrier, a spring for raising the pivoted hook, means for normally holding the hooks in relative positions with the point of each hook guarded by a portion of the other hook, and a catch for holding the pivoted hook crossing the other hook with the points of both hooks exposed.

3. A device of the character described, comprising a carrier, a pair of fish hooks one of which is fixed to the carrier and the other movable relatively thereto, and a bait hook slidingly connected to the carrier, the end of the bait hook being in position to be closed by the edge of the carrier when the bait hook is slid rearwardly.

4. A device of the character described, comprising a carrier having a flat side and a rounded side, the latter having a slot with an inclined side, a hook fixedly secured to the carrier, a second hook pivotally connected with the carrier and having its shank extending through said slot, a spring for normally holding the shank of the pivoted hook against the inner end of the slot, and a bait holder between the hooks.

5. A device of the character described, comprising a carrier having a flat side and a rounded side, the latter having a slot with an inclined side, a hook fixedly secured to the carrier, a second hook pivotally connected with the carrier and having its shank extending through said slot, a spring for normally holding the shank of the pivoted hook against the inner end of the slot, and bait hooks movable relatively to the carrier, the ends of said bait hooks being in position to be normally guarded by an edge portion of the carrier.

6. A device of the character described, comprising a carrier having a flat side and a rounded side and having a small opening at one end and a large opening at the other end, a loop slide extending through the small opening and having a stud, a hook pivotally mounted upon said stud, another hook fixedly secured to the flat side of the carrier, means for limiting the inward position of the stud in the carrier to hold the two hooks normally in position with the point of each hook guarded by a portion of the other hook, and bait-engaging means mounted in the carrier and movable to and from the end having the larger opening.

7. A device of the character described, comprising a hook carrier, two hooks having shank portions and bent pointed end portions projecting in opposite directions, said hooks forming, when the device is set, a loop guarding the points of the hooks and projecting from the carrier to enter the mouth of a fish, the shank portions of the hooks being arranged to be pressed toward each other by the jaws of the fish to cause the bent portions to cross each other and expose the points, a bait holder between said hooks, and means for successively confining the hooks in their loop-forming positions and in their point-exposing positions.

8. A device of the character described, comprising a hook carrier, a hook having a shank portion attached to the carrier and a bent pointed end portion, a second hook having a pivoted shank portion and a bent pointed end portion, the hooks forming, when the device is set, a loop guarding the points of the hooks and projecting from the carrier to enter the mouth of a fish, the shank portion of the pivoted hook being movable by pressure of the jaws of the fish toward the shank portion of the fixed hook to cause the bent portions to cross each other and expose the points, means for successively confining the pivoted hook in its loop-forming and in its point-exposing positions, and a bait holder between said hooks.

9. A device of the character stated, comprising a hook carrier having a flat side, a hook having a shank portion attached to the carrier and an upwardly projecting bent pointed end portion which is perpendicular to the flat side of the carrier, a second hook having a pivoted shank portion and a downwardly projecting, bent, pointed end portion, the hooks forming, when the device is set, a loop guarding the points of the hooks, and projecting from the carrier to enter the mouth of a fish, the shank portion of the pivoted hook being movable by pressure of the jaws of the fish to cause the bent portions of the hooks to cross each other and expose the points of the hooks, means for successively confining the pivoted hook in its loop-forming and in its point-exposing positions, and a bait holder between said hooks, the flat side of the holder being adapted to maintain the hooks vertically when trolling.

10. A device of the character described, comprising a hook carrier, a fixed hook having a shank portion attached to the carrier and a bent pointed end portion, a bait holder movable on the carrier, a second hook having a shank portion pivoted to the bait holder and a bent pointed end projecting oppositely to the bent end of the fixed hook, the bait holder being provided with a spring which normally presses the pivoted hook away from the fixed hook, the hooks forming, when the device is set, a loop guarding the points of the hooks, means on the carrier coöperating with said spring for holding the pivoted hook successively in its loop-forming position and in a position exposing the points of the hooks, the bait holder and pivoted hook being movable endwise outwardly from the carrier to expose the bait holder and permit the spring to outwardly displace the pivoted hook, the carrier being provided with means causing a movement of the pivoted hook to its loop-forming position when the bait holder and pivoted hook are moved endwise inwardly.

In testimony whereof I have affixed my signature, in presence of two witnesses.

WILLIAM L. C. KOCH.

Witnesses:
P. W. PEZZETTI,
H. L. ROBBINS.